March 1, 1960

W. GÜNTHER 2,926,576

PHOTOGRAPHIC CAMERAS ADAPTED FOR
INTERCHANGEABLE LENS SYSTEMS

Filed April 19, 1955

INVENTOR.
Willi Günther
BY
Attorneys

2,926,576
Patented Mar. 1, 1960

2,926,576
PHOTOGRAPHIC CAMERAS ADAPTED FOR INTERCHANGEABLE LENS SYSTEMS

Willi Günther, Stuttgart, Germany, assignor to Zeiss Ikon A.G., Stuttgart, Stuttgart, Germany Application April 19, 1955, Serial No. 502,375

Claims priority, application Germany July 23, 1954

3 Claims. (Cl. 95—44)

The present invention relates to improvements in cameras, and more particularly to cameras having interchangeable lens systems including a central shutter or a part thereof, and which systems are carried in a camera support constructed to permit interchanging of various exchange units.

In cameras of the above type, it has heretofore been common practice to provide the interchangeable lens system with separate scales for computing the depth of field. This construction increases the manufacturing expense and is not economical. In addition, it requires considerable time and tedious labor in making the computations. The interchangeable lens systems heretofore of necessity are provided with an additional rotary ring which co-operates with a focusing scale constructed precisely for this purpose. Since the range adjusted on the camera and the computation of the depth of focus are separate operations, the two must be co-related properly to attain the best results, and as explained above it is time consuming and difficult.

An object of the present invention is to overcome the above disadvantages in the construction of cameras of conventional types by providing the interchangeable units with separate focusing scales, and in addition to provide an indicator mark provided on an adjustable camera member which is constructed to accommodate interchangeable lens systems with a depth of focus scale co-operating with the camera member or support to enable the range as well as the depth of focus to be regulated. The pointer and depth of focus scales being co-related such as to cooperate with the scales on the interchangeable lens systems. Thus, it is merely necessary to select the lens system required or desired for a certain range and insert the same into the camera support wherein the scale thereon will mutually cooperate with the marking on the adjusting member as well as the depth of focus scales thereon.

The use of a single dial support on the camera for focusing preselected lenses of different focal length for the object range has the result that differently divided focusing scales fall in equal dial ranges of the different lenses. However, as already explained the ranges of the depth of focus scale belonging to the individual relative ratios of aperture are independent of the used focal distance so that a single depth of focus scale will be sufficient in the camera for determining the depth of focus on the range scales of all interchangeable lens system units employed.

Another object is to provide a linearly movable support for receiving interchangeable lens units which may be applied to various types of cameras such, for example, as reflex cameras having a view finder in which the camera is adjusted by observing the image produced by the camera lens or by an additional lens, as well as for cameras in which the focusing is attained by means of coupled or uncoupled built-in range finders.

Various arrangements are possible for securing the depth of focus scale to the camera. Of particular advantage is an arrangement employing a dial support for the various interchangeable units which for focusing purposes is guided in a direction parallel with the optical axis of the lens system and non-rotatable. In this construction the indicator mark which cooperates with the scale on the interchangeable lens system is placed on a rotatable member designed to feed the non-rotatable support along the optical axis, and in addition the depth of focus scale is attached to the aforesaid member of the camera to cooperate with the scale on the interchangeable lens unit. On the other hand, if the dial support is threaded in the camera for rotary and axial movement, the indicator mark with the depth of focus scale is installed in a fixed position on the camera in a suitable location opposite the focusing scale of the interchangeable lens system.

In the drawings, wherein there is shown a preferred and practical embodiment of the invention:

Figure 1:
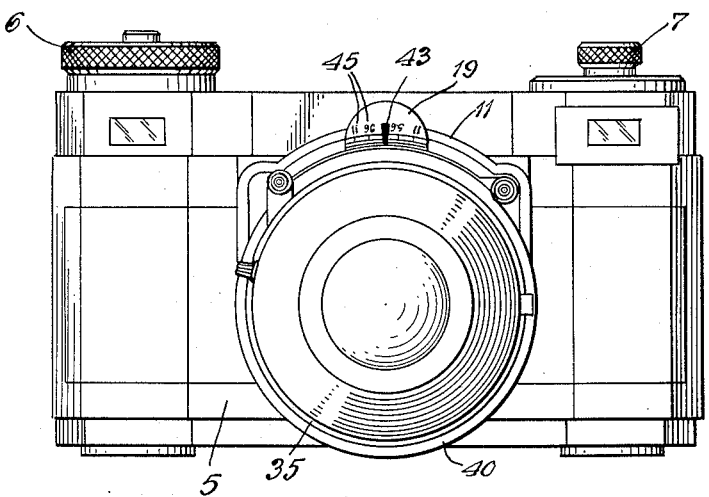
Figure 1 is a front elevational view of a camera showing an interchangeable lens unit in place and illustrating the adjusting member with the lens unit scale cooperating mark and depth of focus scales on the opposite sides thereof.
Figure 2:
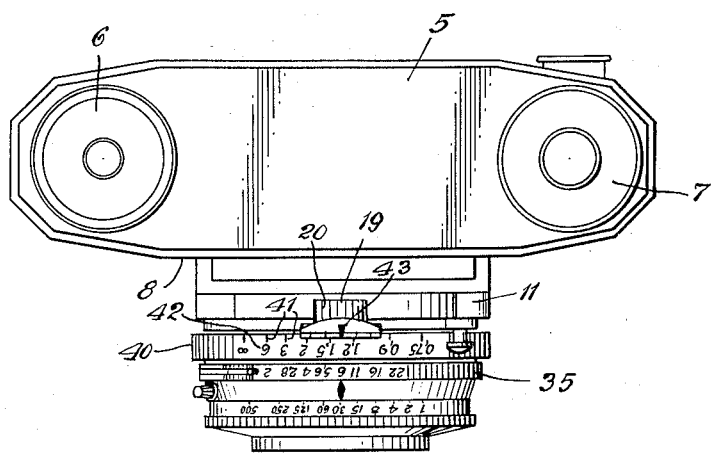
Figure 2 is a top elevational view of a camera embodying the present invention showing the adjusting lever and the manner in which the scale mark thereon is adapted to cooperate with the scale markings on the interchangeable removable lens unit.

In the drawings, and more in detail, there is shown a conventional roll film type camera including a casing 5 of suitable construction having roll manipulating thumb pieces 6 and 7 for moving a roll film in back of a camera aperture, in the front wall 8 of the camera casing 5.

The camera casing 5 may be of the two part type to facilitate changing the film roll, or any other desired construction may serve the purpose as well, and said camera casing is provided in its front wall 8 with a round opening 9 in which a bushing 10 is fitted having an annular portion 11 and a circular flanged portion 12. The metal on the opposite side of the bushing 10 is slightly displaced as at 13 to form a groove for receiving the edge of the camera wall 8 adjacent the opening 9. The annular bushing 11 is thus rigidly affixed to the front wall of the camera and the inner bore thereof as at 14 is concentric with the optical axis of the camera.

Figure 3:
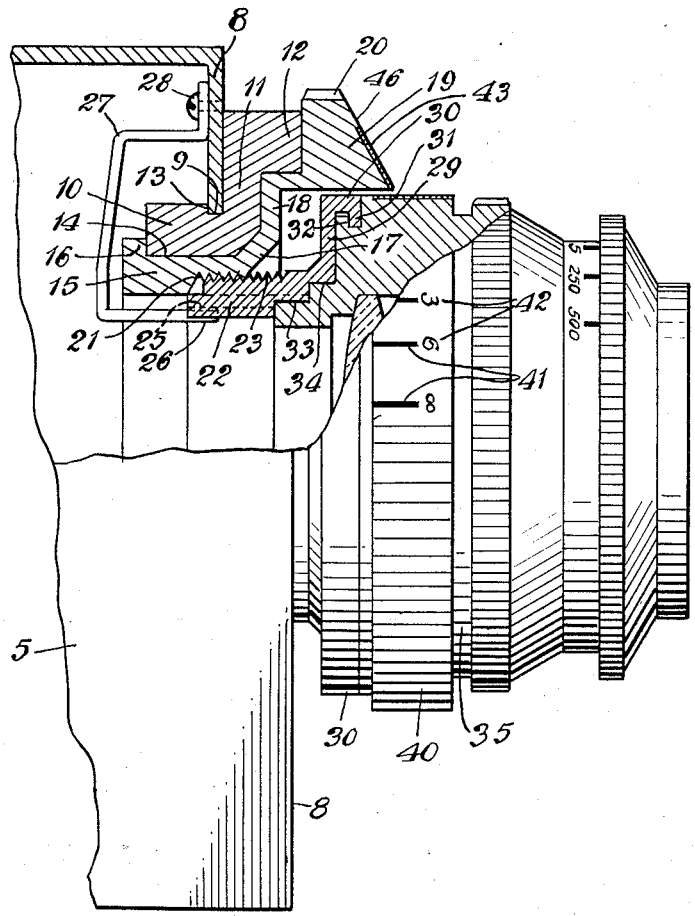
Figure 3 is a fragmentary end elevational view of a camera showing a portion broken away and in section to illustrate various details of construction.

Rotatably mounted in the bushing 11 and received in the bore 14 thereof (Figure 3) is a rotary sleeve 15 having an annular flange 16 abutting the inner end of the bushing 10, while its opposite end is angularly bent as at 17. Formed integral with the annular angular portion 17 is a projection 18 which terminates in a thumbpiece 19 having a plurality of serrations 20 to facilitate adjustment of the cylindrical sleeve 15 and permit the same to be angularly displaced relative to the optical axis of the camera.

Formed within the cylindrical sleeve 15 is a series of internal screw threads 21 which are adapted to threadedly receive an interchangeable lens system support 22 having a correspondingly threaded peripheral surface 23. The interchangeable lens system support 22 (Figure 3) is preferably provided on its inner peripheral surface with a longitudinally extending groove 25 adapted to receive the key-shaped end 26 of a bracket arm 27 which is secured to the inner wall of the camera as at 28. Thus, rotational adjustment or angular displacement of the cylindrical sleeve 15 will move the interchangeable camera support sleeve 22 in a direction parallel with the optical axis of the camera.

The outer end of the interchangeable lens unit supporting sleeve 22 is provided with an annular flange 29 provided with a peripheral flange 30 having one or more inwardly extending projections 31 which are adapted to be received in a bayonet slot 32 in the removable and interchangeable lens unit 35. The lens unit 35 includes suitable lens supports (not shown) and may, or may not, include suitable shutter mechanisms if the same is built-in to the camera. There may be provided a series of such interchangeable lens units 35, each of which includes a cylindrical casing with the rear portion thereof stepped and reduced in diameter as at 33 and 34 to be received in correspondingly shaped portions of the cylindrical adjusting sleeve 22. Further, each of the interchangeable lens systems or units 35 are of identical construction, and hence a description of one will suffice for all.

The quick detachable connection between the removable lens units 35 and the cylindrical unit supporting sleeve 22 may be of a type other than the bayonet and slot type illustrated, wherein the projection or pin 31 is received within a bayonet slot 32 in the rear portion of the interchangeable unit 35.

Formed on the interchangeable lens unit 35 is an enlarged annular portion 40 having a plurality of scale markings 41 graduated by suitable reference numerals 42 indicating distances. The scale markings 41 are adapted to register with a marking 43 on the operating lever 18 and thus, by angularly displacing the thumbpiece 19 the scale mark 43 may be brought into registry with one of the graduation markings 41. As this occurs, the cylindrical lens unit supporting sleeve 22 is fed along the optical axis toward or away from the object depending upon the direction of rotation of the lever projection 18.

In addition, the thumbpiece 19 is provided with a series of similar graduations 45 left and right of the scale mark 43 on the inclined face 46 thereof. The graduations 45 are adapted to register with the graduated marks 41 of the distance scale to thus determine at any adjusted position of the lens unit the depth of focus or the range of the distance within which the pictures taken will have the desired sharpness.

In use, the film is prepared in the camera as usual and the proper interchangeable lens unit 35 is pre-selected according to the desired range within various limits. The unit is then inserted into the cylindical interchangeable lens unit support 22 and the thumbpiece 19 is adjusted so that the mark 43 will be brought into registry with the proper mark 41 indicating the distance the object to be photographed is spaced from the camera. The graduations 45 left and right from the mark 41 will then indicate the two limits in units of length between which the objective will record a sharp image on the film.

If desired, the cylindrical sleeve 15 can be externally threaded and the flange 16 removed so that angular displacement of the operating lever 19 will thread the sleeve 15 into and out of the bushing 10 which may be correspondingly threaded. In this event, the graduation mark 43 and graduations 45 may be permanently affixed to a portion of the camera casing 8.

It is to be understood that the forms of the invention shown and described are to be taken as preferred embodiments thereof and that various changes in the shape, size and arrangement of parts may be resorted to without departing from the spirit of the invention or the scope of the subjoined claims.

I claim:

1. In a camera provided with an interchangeable lens system in which interchangeable lenses of different focal length may be individually mounted on said camera comprising a non-rotatable cylindrical lens unit support mounted in said camera for longitudinal movement along the optical axis thereof, said lens unit support including a sleeve having external threads, quick detachable coupling means for removably connecting a preselected lens unit to said sleeve, a manually rotatable and internally threaded focusing sleeve surrounding and engaging the threads of said first mentioned sleeve, means for rotatably mounting said internally threaded sleeve with its exterior circumference in said camera, said internally threaded focusing sleeve being provided with a projection terminating in a fingerpiece having a single indicator mark common to all of the distance indicating scales on said interchangeable lenses, said detachable coupling means being located in a radial position adjacent said fingerpiece to permit the scale of the lens to be brought into quick registry with the scale marking on said fingerpiece, and other graduations on said fingerpiece and arranged left and right of said single indicator mark, said other graduations providing a depth of focus scale likewise common to all of said interchangeable units having different focal lengths.

2. In a camera provided with an interchangeable lens system adapted to accommodate individual lens units, a camera casing, a non-rotatable lens unit support mounted in said casing for movement along the optical axis of said camera, said lens unit support comprising a sleeve having formed at one end thereof a cup-shaped member for slidably receiving a preselected interchangeable lens unit, a quick detachable connector pin carried by said sleeve engageable with said lens unit to lock the same to said lens unit support, an actuating sleeve rotatably mounted in said camera and having internal threads for threadedly receiving the external threads on said lens unit support for focusing the lens unit attached to said support, an extension on said actuating sleeve having a fingerpiece provided with a single graduation mark common to all of the distance scales arranged on an annular portion of said interchangeable lenses, and two similar scales on said fingerpiece arranged left and right of said single graduation mark and indicating the depth of focus for which the camera objective has been adjusted, and means engageable with said lens unit support for preventing rotation thereof during rotation of said actuating sleeve.

3. In a camera provided with an interchangeable lens system in which the interchangeable lens units are adapted to be individually mounted on said camera, comprising a camera casing having an opening in the front wall thereof, a bushing mounted in said opening, a sleeve rotatably mounted in said bushing having a projection terminating in an enlarged fingerpiece, said sleeve being provided with internal screw threads, a non-rotatable lens unit support having external threads in threaded engagement with the internal threads of said sleeve, an arm supported by said camera received in a slot in said lens unit support for preventing rotation thereof when said sleeve is rotated but permitting said lens unit support to be moved axially along the optical axis of said camera, a flange on said lens unit support having an annular rim for receiving an interchangeable lens unit, said rim being provided with a pin located in a radial position approximately in alignment with said projection adapted to be received in a slot in said interchangeable lens unit, an indicator mark on the enlarged portion of said extension adapted to register with certain circumferentially spaced graduations directly carried on each of said interchangeable lens units, said connecting pin being located in a position such that the scale markings on the interchangeable lens units are presented to the mark on said fingerpiece when individual lens units are assembled on said support.

References Cited in the file of this patent

UNITED STATES PATENTS

| | | |
|---|---|---|
| 1,176,399 | Needham | Mar. 21, 1916 |
| 1,893,712 | Mitchell | Jan. 10, 1933 |
| 1,945,999 | Sabel | Feb. 6, 1934 |
| 2,000,811 | Wallensak | May 7, 1935 |
| 2,027,411 | Whittaker | Jan. 14, 1936 |
| 2,526,433 | Svensson | Oct. 17, 1950 |

FOREIGN PATENTS

| | | |
|---|---|---|
| 517,036 | Germany | Jan. 30, 1931 |